May 29, 1923.
W. L. BRANSTOOL
DEMOUNTABLE RIM FOR WHEELS
Filed Nov. 13, 1922
1,457,016
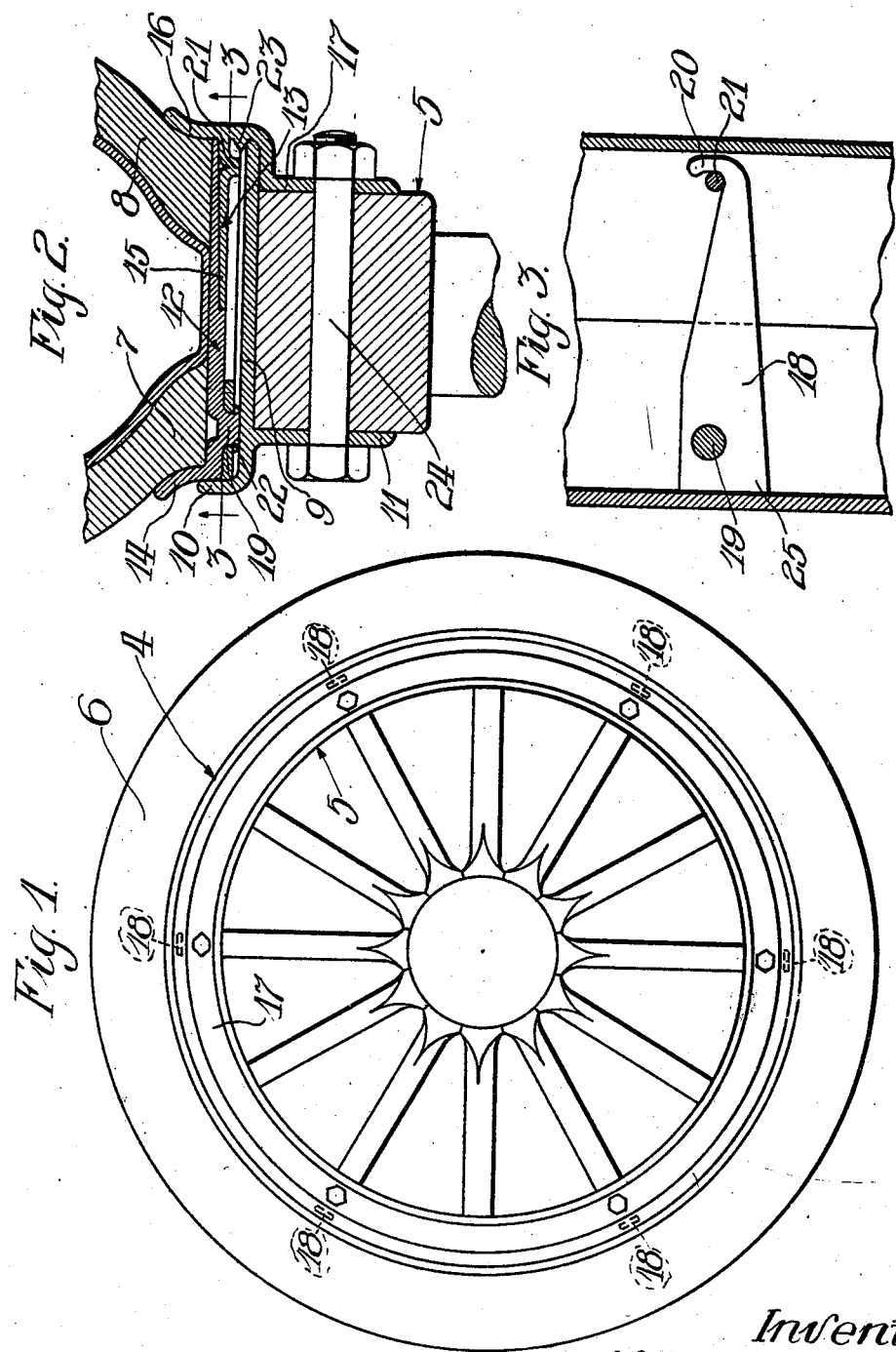

Patented May 29, 1923.

1,457,016

UNITED STATES PATENT OFFICE.

WILLIAM L. BRANSTOOL, OF CHICAGO, ILLINOIS.

DEMOUNTABLE RIM FOR WHEELS.

Application filed November 13, 1922. Serial No. 600,508.

*To all whom it may concern:*

Be it known that I, WILLIAM L. BRANSTOOL, a citizen of the United States, residing at Chicago, in the county of Cook and State of Illinois, have invented certain new and useful Improvements in Demountable Rims for Wheels, of which the following is a specification.

This invention has to do with certain improvements in demountable rims for wheels, and has particularly reference to improvements in demountable rims for the pneumatic tires of motor vehicle wheels. The demountable rim herein disclosed is so constructed that it can be readily set upon or removed from the wheel felloe, and when set thereon can be very firmly locked in position. It is furthermore, so constructed that when removed from the wheel felloe it is fully self contained and of sufficient strength and rigidity to properly carry the tire when inflated.

The main object of the invention is to provide a demountable rim which is so constructed that it can be easily taken apart in order to either insert or remove the tire. In this connection, a further object is to construct the rim of two parts which telescope together, and which when telescoped provide the side flanges against which the bases of the tire abut.

A further object in connection with the foregoing is to provide an improved means for locking the two sections of the rim together, said means comprising a series of hooks which operate between the two rim sections and serve to hook them together and effectively prevent disengagement when the tire is inflated. In connection with the foregoing, a further object is to so form and arrange these hooked members that when the rim is set in place on the felloe, it is impossible for the hooks to turn and thus become disengaged.

Other objects of the invention relate to the provision of a very simple and strong mechanical construction of the parts, and one which can be cheaply and readily manufactured in quantities.

Other objects and uses of the invention will appear from a detailed description of the same which consists in the features of construction and combinations of parts hereinafter described and claimed.

Referring to the drawing:

Figure 1 shows a side elevation of a wheel having a demountable rim embodying the present invention applied thereto;

Fig. 2 is a detailed cross section on enlarged scale and is taken at the position of one of the hooks; and Fig. 3 is a fragmentary longitudinal section taken on the line 3—3 of Fig. 2, looking in the direction of the arrows.

Referring first to Figure 1, the demountable rim in its entirety is designated by the numeral 4. It is shown as being set onto the wheel felloe 5, which in the construction illustrated, is conveniently shown as being a wooden wheel. The tire is designated by the numeral 6, and is shown as being of the Grant type with the straight sides 7 and 8. It will presently appear, however, that the features of the present invention are not limited to use in connection with straight side tires.

The wheel felloe is shown as being provided with an encircling sheath 9 which has the side flange 10 which serves as an abutment for the demountable rim and the further side flange 11 which seats against the side of the wheel felloe 5.

The demountable rim includes the sections 12 and 13. The section 12 is of circular form and is slightly larger in size than the wheel, so that when set in place thereon it clears the wheel by a sufficient clearance to accommodate the locking hooks presently to be described. The section 12 is provided with the outstanding flange 14 which receives pressure of the tire base 7.

The other rim section 13 is adapted to telescope with respect to the rim section 12, and for this purpose the section 12 has its under-face recessed or cut back as shown at 15, and the section 13 is of proper size and thickness to seat into this recessed portion 15.

The section 13 is provided with an outstanding flange 16 which receives the pressure of the tire base 8. The section 13 is also provided with an inwardly projecting flange 17 which is adapted to seat against the opposite side of the wheel felloe which receives the sheath flange 11.

The flange 17 of the demountable rim may be either continuous as illustrated particularly in Fig. 1, or may comprise a series of relatively short disconnected lugs which are adapted to seat against the face of the felloe. The construction is optional as far as this feature is concerned.

On the bottom face of the rim section 12 is a series of hooks 18. These hooks are relatively thin and are of such size that they readily enter the space between the sheath 9 and the demountable rim. Each hook is pivoted to the rim section 12 on a pivot point 19. Each hook reaches over beneath the other rim section 17 and its hooked portion 20 is adapted to engage a pin or lug 21 on the other rim section 10 to lock the two rim sections together. If desired, the hook portions 20 may be slightly undercut as shown in Fig. 3, so that when the tire is inflated, the side thrusts will tend to hold the hooks in the locked positioned.

The pivotal points 19 and the pins or lugs 21 may be established in any convenient manner. In the arrangement illustrated these are established by stamping inwardly, or semi perforating, the metal of the rim sections, so that riveting operations are largely avoided. After the hooks have been set in place on the pivotal points 19 as thus established, said pivotal points can be upset as shown at 22 in Fig. 2, and thus retain the hooks in place. The amount of this upsetting should be such that the demountable rim can be readily set in place on the felloe.

When the demountable rim is set into place on the felloe, it is largely supported and positioned by means of the hooks or the upset portions 22; but it is also positioned by the engagement of the edge of the section 12 with the flange 10. The other side of the rim is provided on its inner face with a slight protuberance 23 which engages the edge of the sheath 9, so that when the demountable rim is drawn firmly into position, this side is also correctly positioned and supported.

The demountable rim is held in place in any convenient manner, as for example by the use of a series of through bolts 24 which reach through the felloe and through the flanges 11 at one side, and through the flange 17 or lugs at the other side. The parts are so proportioned that when these bolts are drawn up solid, the rim is firmly and accurately positioned and supported at both sides.

Each of the hooks 18 may be provided with a heel or shoe 25 which is so positioned with respect to the pivotal point 19, and so proportioned, that when the rim is drawn home said shoe engages the flange 10 in a firm manner, and the hook is thus held against disengagement when the rim is in place on the wheel.

While I have herein shown and described only a single embodiment of the features of the present invention, still I do not limit myself to the same except as I may do so in the claims.

I claim:

1. A demountable rim for the purpose specified comprising in combination a pair of telescoping ring members, one of which is provided with an outstanding flange for engagement by the tire base, and is also provided on its inner surface with a circumferential recessed portion establishing a shoulder, the other ring member being adapted to seat into said recessed portion when the two sections are telescoped together, and said member being provided with an outstanding flange adapted to engage the other tire base portion, an inwardly projecting portion on the last mentioned ring member adapted to engage the felly band when in place on the wheel for the purpose of accurately spacing the demountable rim thereon, and a series of hooks for locking the two ring members together, a pivotal mounting for each hook on the inner surface of the first mentioned ring member, comprising a semi-perforation of said ring member extending through the hook and upset to hold the hook in place, a lug on the other ring member suitably positioned for engagement by each of said hooks and comprising a semi-perforation of said ring member, and a shoe on the base portion of each hook offset with respect to its pivotal point and adapted to engage a part of the felly band when the rim is set thereon to thus prevent turning of the hook when the rim is in place on the wheel, substantially as described.

2. A demountable rim for the purpose specified comprising in combination a pair of telescoping ring members, one of which is provided with an outstanding flange for engagement by the tire base, and is also provided on its inner surface with a circumferential recessed portion, the other ring member being adapted to seat into said recessed portion when the two sections are telescoped together, and said member being provided with an outstanding flange adapted to engage the other tire base portion, an inwardly projecting portion on the last mentioned ring member adapted to engage the felly band when in place on the wheel for the purpose of accurately spacing the demountable ring thereon, and a series of hooks for locking the two ring members together, a pivotal mounting for each hook on the inner surface of the first mentioned ring member, a lug on the other ring member suitably positioned for engagement by each of said hooks, and a shoe on the base portion of each hook offset with respect to its pivotal point and adapted to engage a part of the felly band when the rim is set thereon to thus prevent turning of the hook when the rim is in place on the wheel, substantially as described.

3. A demountable rim for the purpose specified comprising in combination a pair of telescoping ring members one of which is provided with an outstanding flange for engagement by the tire base, and is also provided on its inner surface with a circumferential recessed portion, the other ring member being adapted to seat into said recessed portion when the two sections are telescoped together, and said member being provided with an outstanding flange adapted to engage the other tire base portion, an inwardly projecting portion on the last mentioned ring member adapted to engage the felly band when in place on the wheel for the purpose of accurately spacing the demountable rim thereon, and a series of hooks for locking the two ring members together, a pivotal mounting for each hook on the inner surface of the first mentioned ring member, and a lug on the other ring member suitably positioned for engagement by each of said hooks, substantially as described.

WILLIAM L. BRANSTOOL.